United States Patent [19]
McGilp et al.

[11] Patent Number: 5,024,454
[45] Date of Patent: Jun. 18, 1991

[54] COMPENSATING SEAL

[76] Inventors: Kenneth J. McGilp, 10675 East Ave., Hesperia, Calif. 92345; Stephen N. Affa, 14644 Camelia Hill, Canyon Country, Calif. 91351; Ira R. Newman, 10224 Falun Dr., Sun Valley, Calif. 91352

[21] Appl. No.: 374,532

[22] Filed: Jun. 30, 1989

Related U.S. Application Data

[63] Continuation of Ser. No. 89,269, Aug. 25, 1987, abandoned.

[51] Int. Cl.$^5$ .............................................. F16L 21/02
[52] U.S. Cl. ............................................... 277/207 A
[58] Field of Search ................... 277/1, 12, 103, 152, 277/165, 205, 207, 207 A, 208; 285/53

[56] References Cited

U.S. PATENT DOCUMENTS

| | | | |
|---|---|---|---|
| 3,048,415 | 8/1962 | Shook | 277/207 A X |
| 3,219,354 | 11/1965 | Kazienko | 277/1 X |
| 3,432,176 | 3/1969 | Valenziano | 277/207 A X |
| 3,507,505 | 4/1970 | Mühlner et al. | 277/207 A X |
| 3,544,119 | 12/1970 | Glover | 277/207 A X |
| 4,153,261 | 5/1979 | McLeod | 277/207 A X |
| 4,342,460 | 8/1982 | Eng | 277/1 |

Primary Examiner—Donald A. Griffin

[57] ABSTRACT

An integral ring shaped seal of flexible elastomer material includes one or more oppositely peripherally disposed ridges and grooves for effecting sealing between telescoping male and female conduits, useful in air conditioning and heating ducts for commercial and military aircraft. The ridge(s) is absorbed into the flexible seal body due to compensation provided by the groove(s) which also disappears, thereby insuring sealing against vapor and fluid leakage throughout a broad temperature and pressure range.

7 Claims, 5 Drawing Sheets

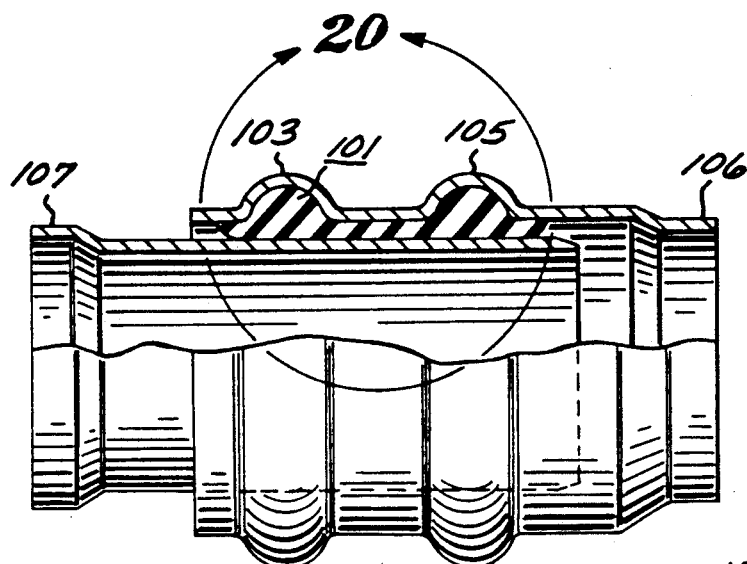
FIG. 16
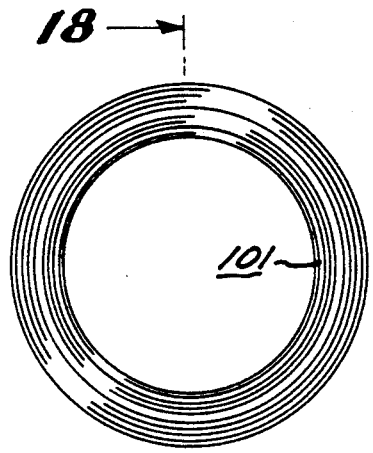
FIG. 17
FIG. 18
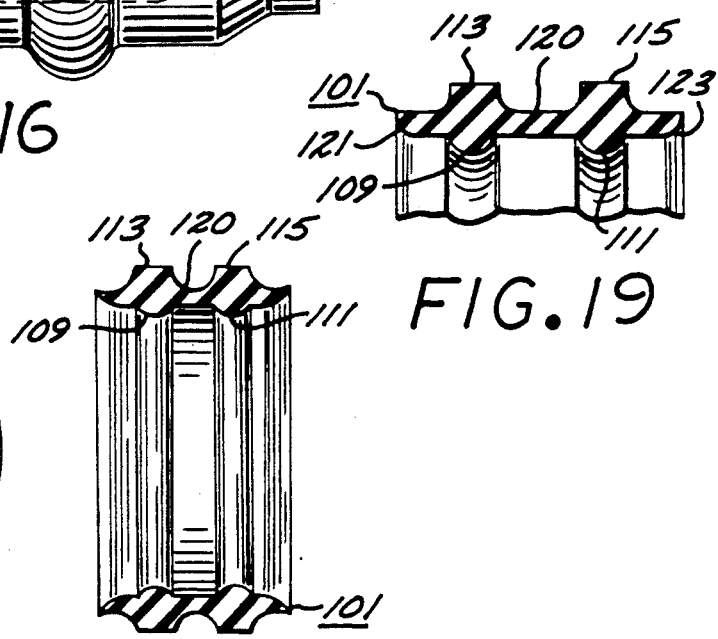
FIG. 19
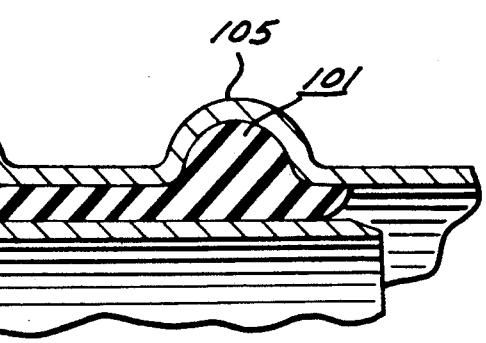
FIG. 20

COMPENSATING SEAL

This is a continuation of co-pending application Ser. No. 07/089,269 filed on Aug. 25, 1987, now abandoned.

FIELD OF THE INVENTION

The invention is an integral ring-shaped seal for use in air conditioning and heating ducts for commercial jet airliners, and the like.

BACKGROUND OF THE INVENTION

Several patents have issued in U.S.Class 277-178 directed to the problem of seal wear owing to abrasion occasioned by repeated flexing. However, some of the seals lack sufficient flexibility, some are very complex to manufacture and too costly, while others do not maintain a tight seal over a sufficiently wide range of temperatures and other conditions encountered in use. As a matter of fact, prior art seals experience some leakage at one or the other of the temperature extremes normally encountered, and it is an important purpose of the present invention to overcome this type of leakage while providing a simple, easy to use, and long-lived seal.

BRIEF SUMMARY OF THE INVENTION

The present invention provides both single and double seals of the flexible integral ring type wherein one or more peripheral ridges are oppositely disposed relative to one or more compensating peripheral grooves. The seal is carried by one connector end and when telescoped relative to another connector end, the flexible seal is squeezed or deformed with the ridge portion collapsing into the flexible seal ring body as permitted by the groove volume which is believed to be used up, thereby providing a self-biasing tight seal on both the inner and outer ring edges to accommodate extended ranges without leakage.

BRIEF DESCRIPTION OF THE FIGURES

FIG. 16 is a view partly in side elevation and partly in ends of connector sections equipped with a still further embodiment of the integral annular seal of this invention;

FIG. 17 is a view in front elevation of the annular seal, per se;

FIG. 18 is a view in section of the seal of FIG. 17;

FIG. 19 is an enlarged partial view in section of the seal showing the opposite peripheral protrusions and raised ribs;

FIG. 20 is an enlarged sectional view of a portion of FIG. 16;

DETAILED DESCRIPTION OF PREFERRED EMBODIMENTS

Figure 1:
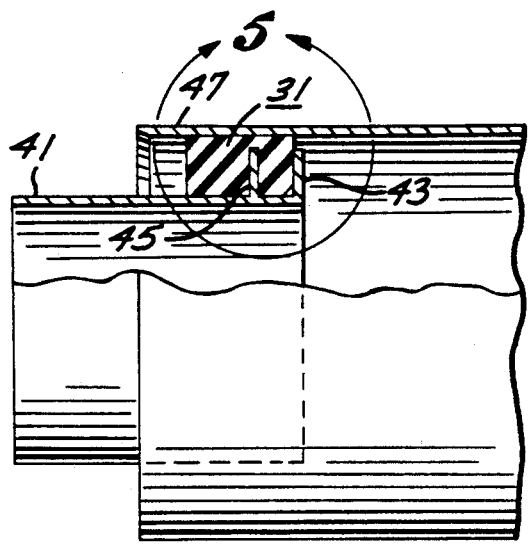
FIG. 1 is a view partly in side elevation and partly in ends of connector sections equipped with one embodiment of the integral annular seal of this invention.
Figure 2:
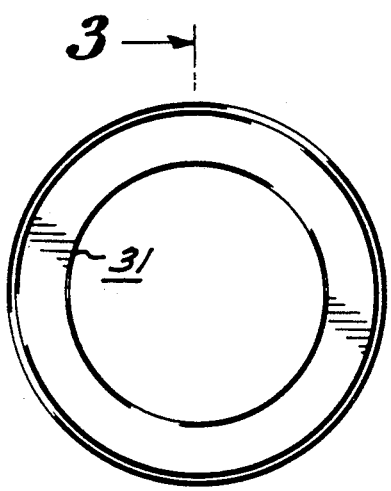
FIG. 2 is a view in front elevation of the annular seal, per se.
Figure 3:
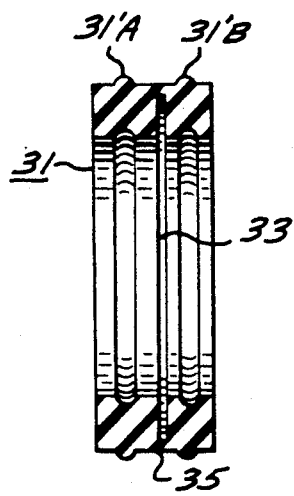
FIG. 3 is a view in section of the seal of FIG. 2.

In FIG. 1, the seal 31 may be molded in a single operation because it is preferably comprised of a fiberglass or filamentary reinforced elastomer in the integral ring shape of FIG. 3. Fiberglass cloth impregnated with an elastomer is cut into strips of predetermined size, depending upon the diameter of the seal to be formed. These strips are hand fabricated on a sizing mandrel. They are then placed into a mold and cured in a hot press to their finished size. These strips may be cut straight or on the bias, depending upon the flexibility desired for the particular use of the seal.

Figure 4:
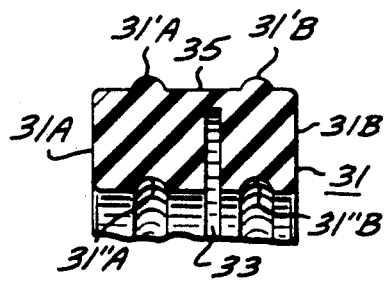
FIG. 4 is an enlarged partial view in section of the seal showing the opposite peripheral protrusion and compensating groove.

The shape of the uncompressed seal is best seen in FIG. 4 where a flange receiving slot 33 is provided radially part way through the ring 31 leaving a web 35 integrally connecting body portions 31a, 31b together. Each body portion includes an external protrusion or ridge (31a, 31b) respectively, and, preferably, a conforming groove (31"a, 31"b respectively).

The purpose of the groove 31"a, for example, is to provide flexing room so that ridge 31"a may be flattened to perfect sealing by body portion 31a. The same structure is used in portion 31b. While it is desirable that the volume of each groove equal the volume of its opposed ridge, it has been found that approximately equal volumes will suffice to provide a good seal along both the seal exterior and interior. The present compensating type of sealing increases the actual sealing surface the equivalent of four or five times. The entire surface(s)

becomes a seal because the resiliency of the ridge in trying to "pop out" maintains the sealing surfaces.

Figure 5:
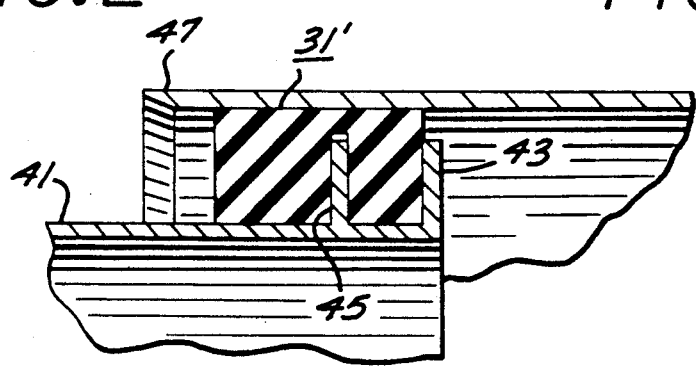
FIG. 5 is an enlarged sectional view of a portion of FIG. 1.

A further advantage of the present seal may be observed from FIGS. 1 and 5 where it is apparent that all metal to metal contact has been eliminated, thus enhancing the seal life. Also, less chafing and flexing is encountered by the seal because of the firm outward biassing of the pushed in ridge(s) or protrusion(s).

Thus, in FIG. 1, it may be seen that the male connector 41 carries the seal 31 in abutting engagement with its innermost end Flange 43 with slot 33 receiving the other Flange 45.

FIG. 5 best shows that seal 31 entirely fills the spacing between outer female connector 47 and male connection 41 between the flanges 43 and 45 and beyond flange 45 for the rest of the length of seal 31.

Seal 31 is first seated on connector 41, and then the male connector is slid or telescoped into female connector 47. It should be noted that the flanges serve to maintain the seal in place during this insertion.

Figure 4A:
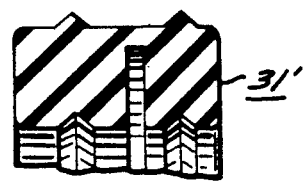
FIG. 4A shows a modified protrusion and groove in a sectional view similar to FIG. 4.

FIG. 4A shows modified protrusions 31'a' and 31'b' with corresponding grooves 31"a' and 31"b'. Other corresponding shapes may be employed. The larger the diameter of the seals, the more important it is to have conformity of ridge to corresponding groove in configuration and volume.

The height and depth of the ridges and grooves is in the range 0.005" to 0.25" depending upon the application.

FIGS. 6-10 show a second embodiment wherein the flange-free body portion 53 of seal 51 is substantially altered. It no longer includes a ridge or groove but it is shaped to be squeezed when in operative position, thereby affording a different type of sealing. However, the flange-received body portion 55 includes the groove 57 and protrusion 59 to add the effective sealing described, supra Slot 61 and web 63 separate the two body portions with portion 53 slightly depending from portion 55, and also with the upper edge or corner edge 65 protruding above portion 55. This structure forces the body portion to be squeezed between the telescoped connectors 67 and 69 (sleeve) to cooperate with the compensation sealing.

An advantage to this shape is improved sealing at low pressure due to additional squeeze and also improved sealing at high pressure (relative to this type structure without the squeezed in portion 53).

Figure 9:
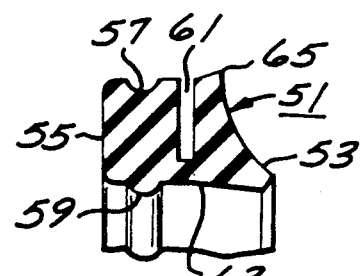
FIG. 9 is an enlarged partial view in section of the seal showing the receiving slot and the opposite peripheral protrusion and compensating groove.
Figure 9A:
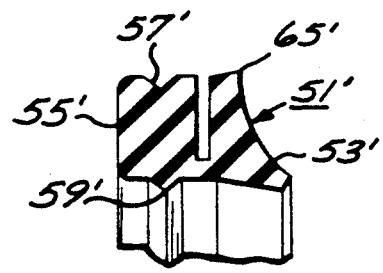
FIG. 9A shows a modified protrusion and groove in a sectional view similar to FIG. 9.

The modified groove 57' and ridge 59' are used in FIG. 9A.

Figure 6:
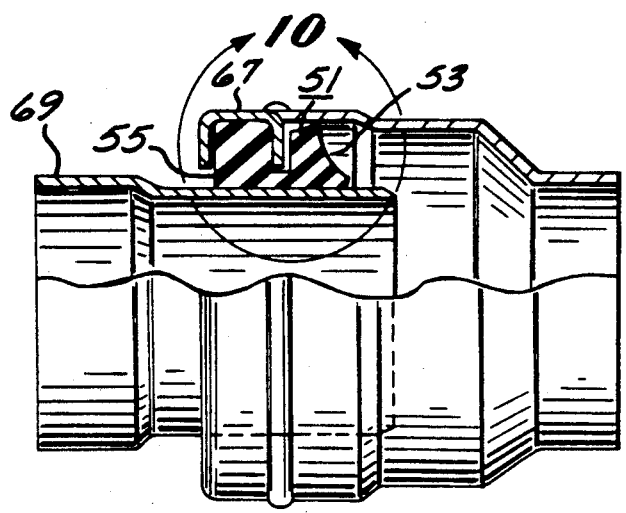
FIG. 6 is a view partly in side elevation and partly in section of telescoping ends of connector sections equipped with another embodiment of the integral annular seal of this invention.
Figure 7:
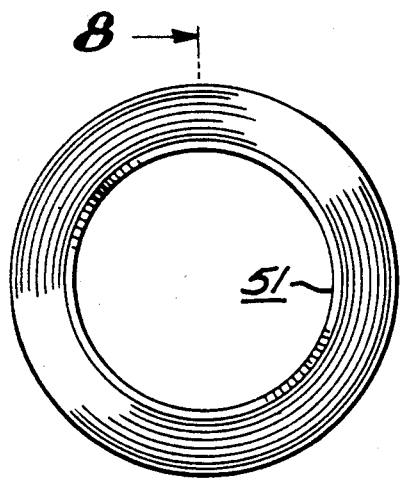
FIG. 7 is a view in front elevation of the annular seal, per se.
Figure 8:
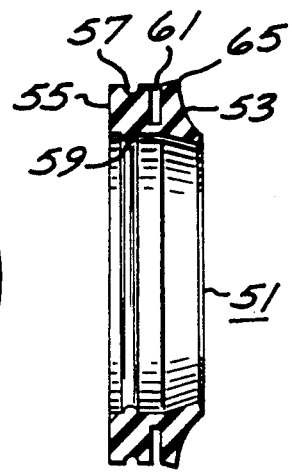
FIG. 8 is a view in section of the seal of FIG. 7.
Figure 10:
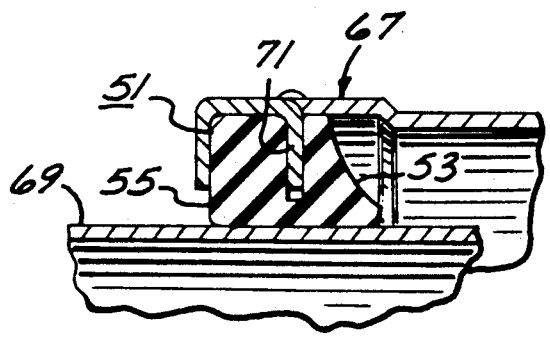
FIG. 10 is an enlarged sectional view of a portion of FIG. 6.
Figure 11:
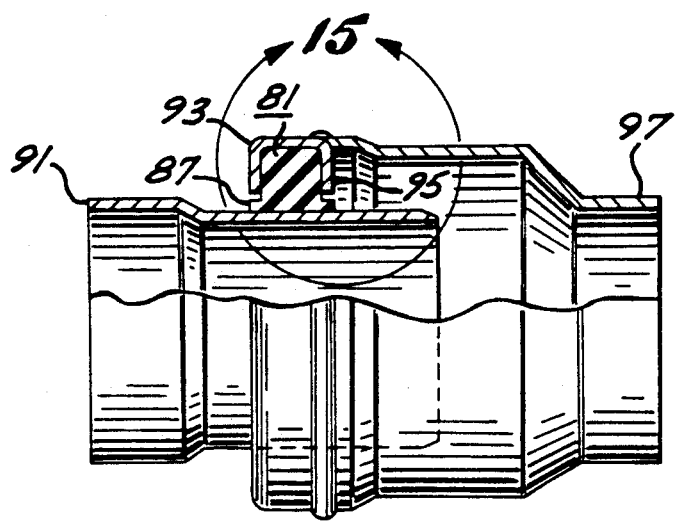
FIG. 11 is a view partly in side elevation and partly in section of telescoping ends of connector sections equipped with a further embodiment of the integral annular seal of this invention.
Figure 12:
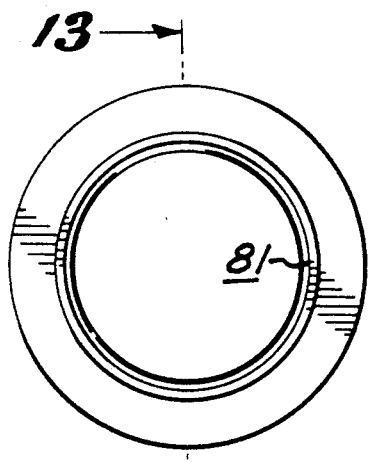
FIG. 12 is a view in front elevation of the annular seal, per se.
Figure 13:
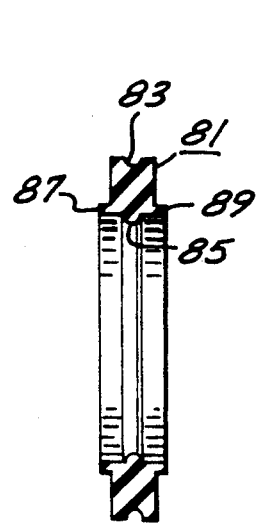
FIG. 13 is a view in section of the seal of FIG. 12.

FIGS. 6 and 10 show seal 51 mounted with flange 71 in slot 61, but with female outer connector housing 67 carrying the seal 51. Also note the interchangeability of groove 57 and ridge 59 relative to the exterior and interior of ring seal 51. This interchangeability holds true for all embodiments. Also, in general, double seals provide longer life, so are preferable if the expense is authorized and the connectors will accommodate them.

Another advantage of the squeezed body portion 53 is the provision of an immediate seal even under cold air and low pressure conditions, as well as providing an underwater seal.

FIGS. 11-15 depict a single flange received seal 81 with groove 83 and ridge 85 oppositely disposed. Seal 81 includes inner peripheral flanges 87, 89 which provide a wider base on connector sleeve 91 than the width of the region between outer and inner flanges 93, 95 of the female connector housing 97 which receives the seal.

Figure 15:
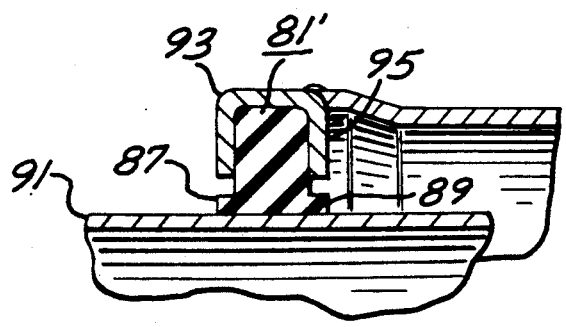
FIG. 15 is an enlarged sectional view of a portion of FIG. 11.
Figure 21:
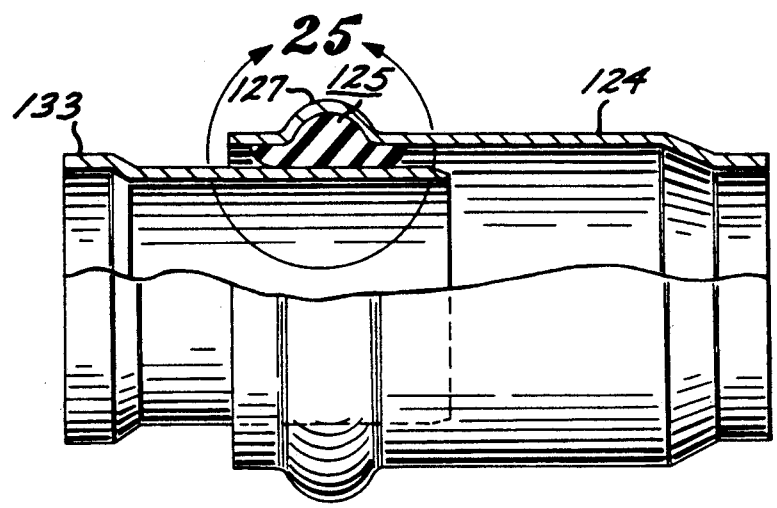
FIG. 21 is a view partly in side elevation and partly in section of telescoping ends of connector sections equipped with a different embodiment of the integral annular seal of this invention.
Figures 22, 23, 24:
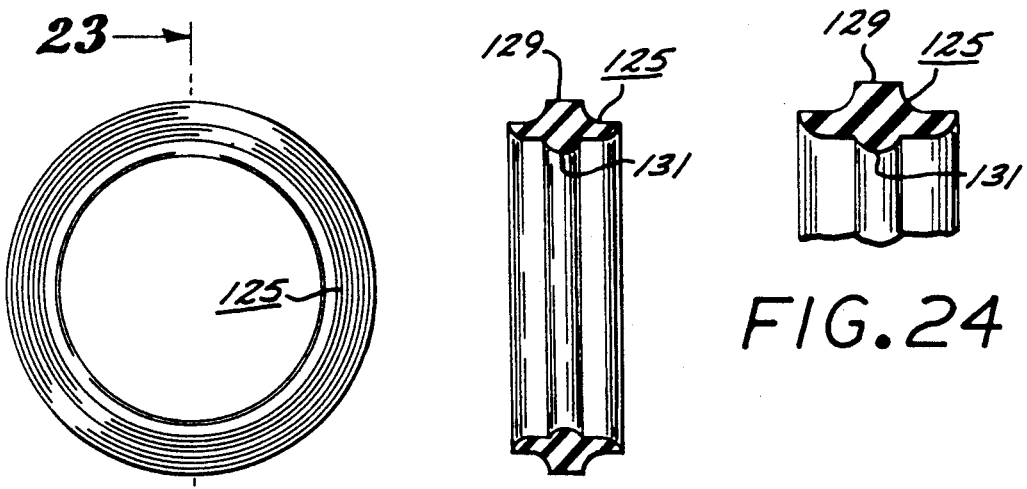
FIG. 22 is a view in front elevation of the annular seal, per se.
FIG. 23 is a view in section of the seal of FIG. 21.
FIG. 24 is an enlarged partial view in section of the seal showing the opposite peripheral protrusion and raised rib; and, FIG. 25 is an enlarged view of a portion of FIG. 21.
Figure 25:
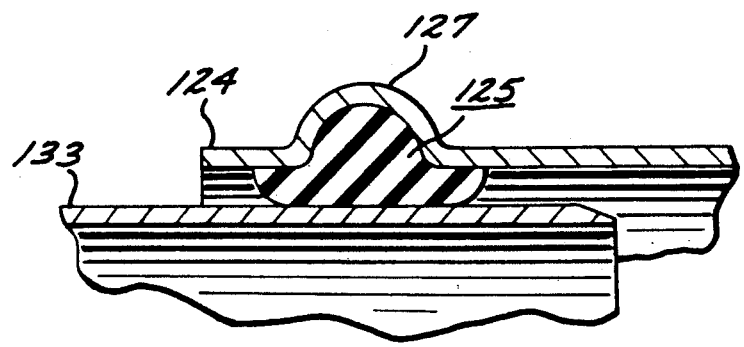

FIG. 15 shows the seal 81 in operative position with the ridge 85 being engulfed in the seal 81, as is also true of the compensating groove 83.

Figure 14:
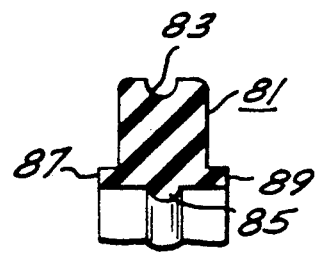
FIG. 14 is an enlarged partial view in section of the seal showing the opposite peripheral protrusion and compensating groove.
Figure 14A:
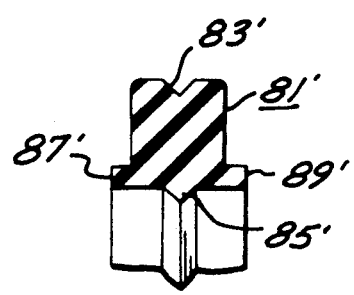
FIG. 14A shows a modified protrusion and groove in a sectional view similar to FIG. 14.

FIG. 14A shows the use of V groove 83' and V ridge 85' in lieu of the preferred structure.

FIGS. 16-20 show a different type compensating dual seal 101 wherein double beading 103, 105 formed in the female housing connector 106 receives the seal 101 and firmly holds it in place when the male connector sleeve 107 is telescoped into the female.

In this embodiment, the groove has been transferred into the housing 106 which allows much greater tolerance as the housing can take up much more of the seal material displacement.

In this double seal, ridges 109 and 111 appear as before but opposite these ridges are raised peripheral ribs 113, 115 which are respectively accommodated by the beading 103, 105. The cutout or valley portion 120 permits nesting of the ribs in the beads and the wings 121, 123 conform to the regular diameter of housing 106.

The housing connector 106 is readily formed into the proper beaded shape by a beading machine in a few minutes at one fourth the price of the more conventional housings.

Another feature of this embodiment is the fact that this seal is under very substantial compression due to the outward extending portions (113, 109) on both sides of the seal 101.

FIGS. 21-25 show a single seal 125 of the type available by cutting seal 101 of FIG. 19 in half. The female housing 124 is beaded at 127 to receive rib 129 with the opposite ridge 131 being squeezed into the body of seal 125 by connector sleeve being telescoped into female 124. This seal performs most satisfactorily and is even less expensive than the previous seals.

Other advantages of the seals of this invention include unique resistance to abrasion and wear; enhanced ability to cope with thermal cycling; extended sealing edge surfaces; locked in position; and greatly improved sealing.

What is claimed is:

1. An integral ring shaped seal for effecting sealing between telescoped inner and outer tubular members, comprising, in combination:
   a body of flexible elastomer material;
   at least a portion of said body adapted to fit between a pair of spaced apart flanges carried by one of said members with said flanges extending toward but terminating short of the other of said members;
   an integral peripheral protrusion about the body extending outwardly thereof in the direction of the other member for resilient engaging contact therewith;
   a compensating groove in the body adjacent said one member and opposite the protrusion whereby telescoping said members together squeezes the protrusion in a direction inwardly of the body permitted by alteration of the shape of the compensating groove to seal the telescoped members against both high pressure and low pressure leakage; and,
   said body extending longitudinally beyond said flanges along the flanged member and that flange which is innermost on the member carrying the flanges thereby locking the seal in sealing position.

2. The seal of claim 1, wherein:
   the body extending longitudinally comprises an integral peripheral protrusion about the extended body and a compensating groove in the extended body opposite the last mentioned protrusion to further enhance sealing.

3. The seal of claim 1, wherein:
the body extending longitudinally beyond the flanges terminates in a substantially concave shaped end forming a pair of spaced apart edge regions which respectively resiliently bear against said members to squeeze the extending body for providing good low pressure sealing and enhancing high pressure sealing.

4. The seal of claim 3, wherein:
said body extending longitudinally is tapered longitudinally to provide larger external and internal body diameters in the extended body portion than the body.

5. An integral ring shaped double cavity seal for effectively sealing between telescoped inner and outer tubular members comprising, in combination:
a body ring of flexible elastomer material having a first section adapted to fit between a pair of spaced apart flanges carried by one of said members with said flanges extending toward but terminating short of the other of said members;
a second section of said body being tapered from outer front diameters to larger inner rear diameters longitudinally of said members such that when the members are telescoped, the spacing between the members is too small to accommodate the second section body inner and outer diameters resulting in squeezing the body at least along an inner diameter region to form a seal against both high and low pressures.

6. The seal of claim 5 wherein:
the inner face of the body is concave to permit body squeezing in the inner diameter region.

7. A seal for preventing fluid and vapor escape from a union of a male and female member comprising, in combination;
a generally ring shaped flexible integral body of elastomer material adapted to be received in a bead of one of said members;
said body having a peripheral wing rib extending outwardly thereof and edges on either side of the ridge;
said body having an inner peripheral ridge oppositely disposed from the rib, whereby telescoping of said members causes the body to absorb the internal ridge and the ridge to fill the bead, thereby effecting sealing;
a second similar seal accommodated by a second bead of said one member with the first and second seals being integral between their respective ribs and ridges; and,
seal wings extending outwardly of the respective rib-ridge locations to comprise an elongated seal.

* * * * *